United States Patent
Guedj

(10) Patent No.: US 9,953,305 B2
(45) Date of Patent: Apr. 24, 2018

(54) ONLINE PAYMENT SYSTEM AND METHOD ACCORDING TO THE MIRROR AUTHORIZATION SERVER PRINCIPLE

(71) Applicant: OONETIC, Toulouse (FR)

(72) Inventor: Marc Guedj, Toulouse (FR)

(73) Assignee: OONETIC, Toulouse (FR)

( * ) Notice: Subject to any disclaimer, the term of this patent is extended or adjusted under 35 U.S.C. 154(b) by 316 days.

(21) Appl. No.: 13/657,105

(22) Filed: Oct. 22, 2012

(65) Prior Publication Data
US 2014/0114853 A1 Apr. 24, 2014

(51) Int. Cl.
*G06Q 20/00* (2012.01)
*G06Q 20/12* (2012.01)

(52) U.S. Cl.
CPC .................... *G06Q 20/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,671,786 B2* | 12/2003 | Wang | ........... | G06F 11/2074 707/999.2 |
| 6,772,337 B1* | 8/2004 | Yener | ........... | H04L 63/0435 380/279 |
| 6,859,811 B1* | 2/2005 | Chandrasekaran | . | G06F 11/1425 |
| 7,047,287 B2* | 5/2006 | Sim | ........... | G06F 17/30194 707/E17.01 |
| 7,076,553 B2* | 7/2006 | Chan | ........... | G06F 17/30067 707/E17.01 |
| 7,188,273 B2* | 3/2007 | Allen | ........... | G06F 11/2028 714/6.3 |
| 7,793,060 B2* | 9/2010 | Zohar | ........... | G06F 3/0607 711/161 |
| 7,921,328 B1* | 4/2011 | Gulati | ........... | G06F 11/2074 711/162 |
| 8,290,819 B2* | 10/2012 | Bawcutt | ........... | G06Q 21/10 705/26.1 |
| 8,375,127 B1* | 2/2013 | Lita | ........... | G06F 17/3089 370/389 |
| 8,577,803 B2* | 11/2013 | Chatterjee | ........... | G06Q 20/36 705/41 |
| 8,682,719 B2* | 3/2014 | Laramy | ........... | G06Q 30/0239 705/14.1 |
| 2002/0138445 A1* | 9/2002 | Laage | ........... | G06Q 20/02 705/67 |

(Continued)

*Primary Examiner* — Mohammad Z Shaikh
(74) *Attorney, Agent, or Firm* — Young & Thompson

(57) ABSTRACT

A system and method for online payments over the Internet, able to handle several transactions coming from various participants and contributing to a single payment on a merchant's bank account. In many cases, the modifications designed to make a merchant server capable of managing transactions from several participants contributing to a single payment are difficult, even impossible, to carry out since the server's architecture is imposed by the structure of the e-commerce platform used. A server (4), called mirror authorization server, is added and connected to a set typically formed by a customer computer (1), a merchant server (2) and a bank authorization server (3). In particular, the mirror authorization server is used to replace the actual bank authorization server for the purpose of performing certain operations.

12 Claims, 4 Drawing Sheets

(56) References Cited

U.S. PATENT DOCUMENTS

| | | | |
|---|---|---|---|
| 2003/0042301 A1* | 3/2003 | Rajasekaran | G06Q 20/02 235/380 |
| 2004/0098425 A1* | 5/2004 | Wiss | G06F 11/2071 |
| 2004/0158588 A1* | 8/2004 | Pruet, III | G06F 17/30578 |
| 2005/0160315 A1* | 7/2005 | Chandrasekaran | G06F 11/1474 714/15 |
| 2007/0106619 A1* | 5/2007 | Holdsworth | G06Q 20/04 705/67 |
| 2007/0267479 A1* | 11/2007 | Nix | G06Q 20/10 235/379 |
| 2008/0040261 A1* | 2/2008 | Nix | G06Q 20/04 705/39 |
| 2008/0040276 A1* | 2/2008 | Hammad | G06Q 20/085 705/44 |
| 2008/0126833 A1* | 5/2008 | Callaway | G06F 11/1641 714/6.1 |
| 2009/0271315 A1* | 10/2009 | Hammad | G06Q 20/04 705/41 |
| 2010/0057554 A1* | 3/2010 | Lanford | G06Q 20/20 705/14.38 |
| 2010/0070376 A1* | 3/2010 | Proud | G06Q 20/20 705/21 |
| 2010/0130164 A1* | 5/2010 | Chowdhury | G06Q 20/02 455/410 |
| 2010/0325006 A1* | 12/2010 | White | 705/26 |
| 2011/0112918 A1* | 5/2011 | Mestre | G06Q 20/20 705/16 |
| 2011/0166992 A1* | 7/2011 | Dessert | G06Q 20/0655 705/39 |
| 2012/0117421 A1* | 5/2012 | Craft | G06F 11/1471 714/15 |
| 2013/0304559 A1* | 11/2013 | Stone | G06Q 20/06 705/14.33 |
| 2014/0114853 A1* | 4/2014 | Guedj | G06Q 20/12 705/44 |
| 2014/0229305 A1* | 8/2014 | Ellan | G06Q 20/209 705/17 |

* cited by examiner

ONLINE PAYMENT SYSTEM AND METHOD ACCORDING TO THE MIRROR AUTHORIZATION SERVER PRINCIPLE

The subjects of the present invention are a system and method for online payments over the Internet, able to handle several transactions coming from various participants and contributing to a single payment on a merchant's bank account.

The term "online payment" means here the action of transferring money electronically to a merchant's bank account with no financial intermediary and no buffer bank account.

Preamble

Figure 1:
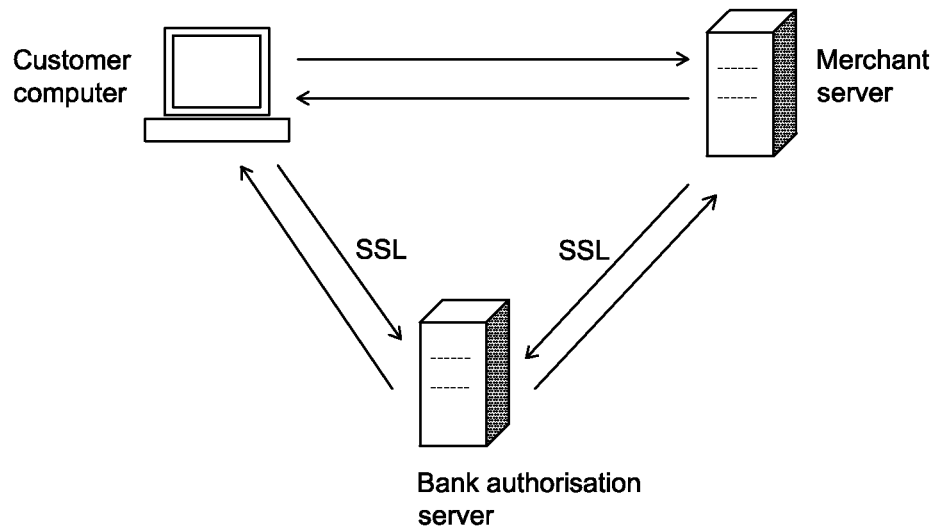

Conventional online payment systems match a single customer to a given payment. The payment system that is the most common, and called "conventional", is illustrated in FIG. 1.

Said conventional system comprises a customer computer, a server belonging to or connected to the financial institution managing the merchant's account and called the bank authorization server, and a merchant server hosting the merchant's website.

In said conventional system, one of the roles of said bank authorization server is in particular to send a message, called "payment receipt token" (or, more simply, payment token), to the merchant server when a payment request (with a bank card number, for example) is sent to it via a secure connection (SSL) by the customer computer.

The payment token having thus been delivered, the payment is deemed to be accepted and authorized. The order can then proceed. Its characteristics, as well as the associated payment token (generally a bank transaction number) are processed and stored in the back-office database of the merchant server.

Another major role of said bank authorization server is, of course, to permit the transaction itself to be completed; this includes decreasing the balance of the customer's bank account and increasing the balance of the merchant's bank account by the relevant amount.

Figure 2:
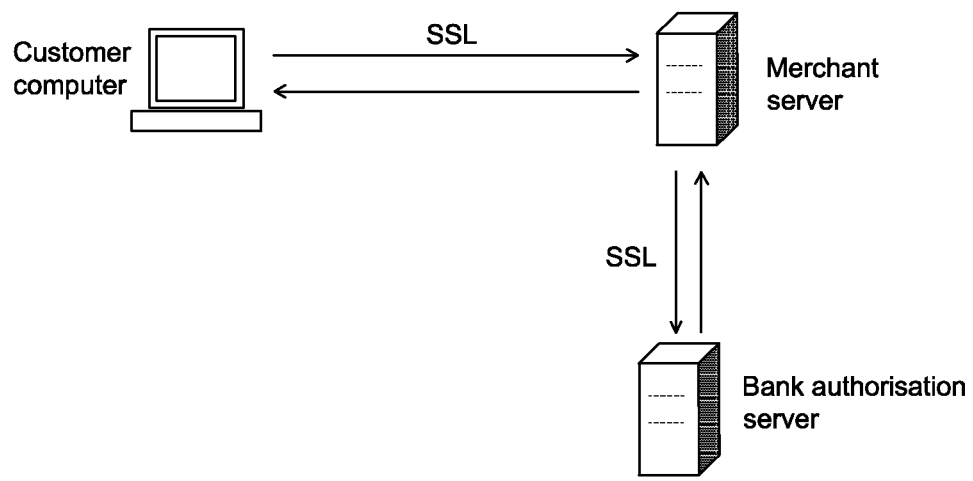

A variant of this payment system, equally conventional, is illustrated in FIG. 2. It only differs from the previous system in that the payment request is sent directly to said bank authorization server by the merchant server itself, after having obtained the payment information from the customer computer (such as a bank card number to be debited).

Figure 3:
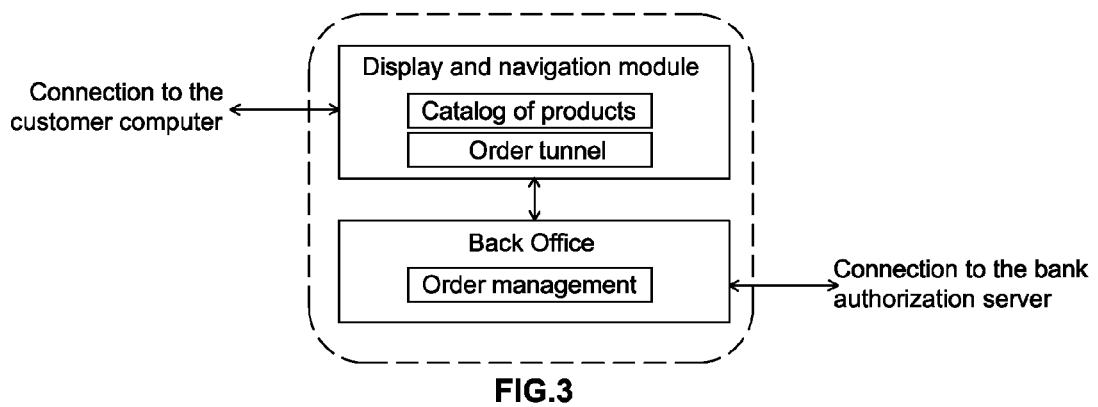

The typical architecture of a merchant server operating in a payment system known as "conventional" is illustrated in FIG. 3. A typical merchant server comprises a display and navigation module (associated to a database of products), a payment module (generally called the order tunnel) and a back-office for managing the orders.

In the current state of the art, this type of architecture, called "typical", has no ability to process and manage several transactions contributing to a single online payment.

Still in the current state of the art, in order to make a merchant server capable of such tasks the server's architecture must be modified substantially.

This modification, close to a complete redesign, is particularly complex since it involves dealing with virtual prepaid accounts, which notably impacts the core of the back-office.

Figure 4:
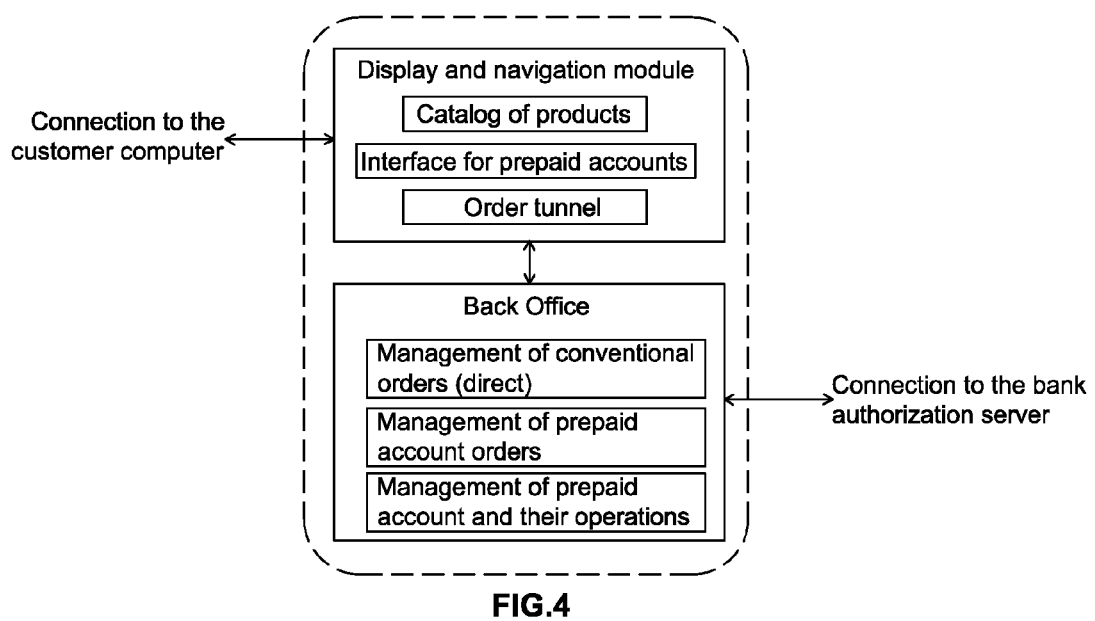

FIG. 4 illustrates this type of architecture which comprises, in addition to the conventional modules of a typical architecture, an interface for managing virtual prepaid accounts, a module for managing these accounts and their operations for crediting them through banking transactions, a module for managing and recording orders paid by the virtual prepaid accounts.

In order to explain to the reader the operating principle of a virtual prepaid account (this notion being known elsewhere), one can cite as a current application of this principle the system of "donations" in, for example, wedding gift lists or baby gift lists. A "gift list" thus represents a virtual prepaid account.

In many cases, the modifications designed to make a merchant server capable of managing transactions from several participants contributing to a single payment are quite simply impossible to carry out since said server's architecture is imposed by the structure of the e-commerce platform used, which either does not provide for this or is not sufficiently flexible to support such modifications.

When the architecture of the merchant server is sufficiently flexible, the changes to be made are substantial and complex and represent a technical and financial risk that forms a serious obstacle for most online merchants.

OBJECTIVES OF THE INVENTION

The aim of this invention is therefore to provide an online payment system and method able to handle several transactions contributing to a single payment and which does not reproduce the drawbacks mentioned above.

More specifically, the aim of this invention is to provide a payment method and system that does not require substantial modifications to the architecture of a typical merchant server or to its order processing procedure.

Equally, the aim of this invention is to be used generically and simply by many merchant servers at the same time.

DESCRIPTION OF THE INVENTION

The invention envisages a system for transferring data, called "online payments", comprising the following: at least one computer, called "customer computer", connected to a communications network that supports an Internet type data exchange protocol, at least one first server connected to said network, called "merchant server", each said merchant server hosting at least one set of data formatted as pages designed to be transferred over the network and displayed on the customer computers, said data defining a "merchant site" and at least one "product or service proposed for sale", at least one second server connected to said network, called "bank authorization server", said bank authorization server hosting at least one database associated to at least one merchant site, this database being called "merchant bank account", means of modifying data, called "payment means", of the bank authorization server, these said payment means allowing in particular data to be transferred, added to or subtracted from at least one merchant bank account, this system comprises:
at least one third server connected to said network and called "mirror authorization server",
means of creating and initializing, from each customer computer, at least one virtual data file comprising in particular digital data, this data file being called "virtual prepaid account"; this creation and initialization is carried out by the customer computer in a database hosted on said mirror authorization server, the virtual prepaid account being associated to at least one unique identification data item, means of adding digital data, called "instant or deferred crediting means", from this or these virtual prepaid accounts by means of operations controlled by the mirror authorization server and performed on the bank authorization server, in the form of digital additions crediting the merchants' bank accounts.

In other words, the data transfer system is an online payment system. It includes one or more computers, called "customer computers", connected to the network, one or more servers connected to the network and called "merchant servers" because they host merchant sites, a server connected to the network and called "bank authorization server" because it belongs to or is connected to a financial institution managing the merchants' bank accounts, payment means of the bank authorization server that allow payments to be made directly to the merchants' bank accounts, this system comprises:

an additional server connected to the network and called "mirror authorization server", means for the customer computers to create and initialize virtual prepaid accounts on said mirror authorization server, instantaneous or deferred means of crediting these said virtual prepaid accounts by means of operations, which are controlled by the mirror authorization server and performed on the bank authorization server, directly crediting the merchants' bank accounts, means of subtracting digital data, called means of debiting the virtual prepaid accounts on the mirror authorization server.

According to various implementations that may be used together, the data transfer system also comprises:

means of accessing virtual prepaid accounts (on the mirror authorization server) from the customer computers, said access being controlled by requesting the identifier associated with the virtual prepaid account, means of detection that make it possible to detect which merchant server the virtual prepaid accounts are being queried from, means of recording operations carried out on the virtual prepaid accounts in an operations database.

According to a preferred implementation, the online payment system is such that the mirror authorization server comprises network communications means that utilize inputs and outputs having identical formats to those of the bank authorization server's communications means.

According to an advantageous implementation, the communications means on the mirror authorization server comprises, just like the bank authorization server, means of generating and transmitting via the Internet network a message, called "payment receipt token". This message is an item of information, obtained after digitally comparing the balance of a virtual prepaid account and the amount associated with an order, that indicates whether or not this prepaid account has the necessary balance to confirm this order, i.e. greater than or equal to the value of said order.

An order is defined as being a record of an item of information in the merchant server database, which indicates that a customer computer has transmitted a message formatted according to a predefined protocol via the network (Internet in this case), which message corresponds to a request to supply at least one item or one service proposed for sale. Data defining this item or service are stored in a database of the merchant site and these data are displayed in the form of pages designed to be transferred over the network and viewed on the customer computers.

The payment receipt token is then processed by the merchant server in order to update the database of orders.

In other words, it is understood that the mirror authorization server generates a payment receipt token, which can be used by the merchant server when an order is placed from a customer computer by means of a credit balance available in a prepaid account belonging to said customer computer.

According to an advantageous implementation, the online payment system comprises means of detecting merchant servers consulted by the customer computers and display means adjusted for the merchant servers detected.

A consultation of the merchant server by a customer computer comprises a request according to an HTTP type of protocol (known per se by the person in the field), sent by a customer computer to the merchant server for the purpose of allowing a specific display on the customer computer.

A display adjusted for the merchant server detected is a display whose graphic characteristics (colors, shapes, logos) are based on the usual display provided by the merchant server consulted by the customer computers.

According to an advantageous implementation, the online payment system comprises means of identifying customer computers that have virtual prepaid accounts, in particular by identifier and password.

In a particular embodiment, a unique identifier is associated to each customer computer and a password provides security of access to the data. An encrypted connection utilizing an SSL ("Secure Socket Layer") type of protocol known by the person in the field ensures the integrity and confidentiality of the authentication data during their transfer over the Internet network between the customer computers and the mirror authorization server.

Advantageously, the online payment system comprises means of canceling prepaid account debits, for the purpose of canceling orders placed by means of one of these virtual prepaid accounts.

According to another implementation, possibly used in conjunction with the previous ones, the online payment system comprises means of canceling or refunding provisions (i.e. the balance if this is positive) credited to the virtual prepaid accounts.

In a second aspect the invention envisages an online payment method for a system comprising:

at least one computer, called "customer computer", connected to a communications network that supports an Internet type data exchange protocol, at least one first server connected to said network, called "merchant server", each said merchant server hosting at least one set of data formatted as pages designed to be transferred over the network and displayed on the customer computers, said data defining a "merchant site", at least one second server connected to said network, called "bank authorization server", said bank authorization server hosting at least one database associated to at least one merchant site, this database being called "merchant bank account", means of modifying data, called "payment means", of the bank authorization server, these said payment means allowing in particular data to be transferred, added to or subtracted from at least one merchant bank account, The method comprises steps:

of creating and initializing virtual prepaid accounts by the customer computers on said mirror authorization server, of crediting these said virtual prepaid accounts in instantaneous or deferred manner by means of operations controlled by the mirror authorization server and performed on the bank authorization server directly crediting the merchants' bank accounts, of debiting prepaid accounts on the mirror authorization server, for the purpose of confirming orders placed on the merchant server and paid by the virtual prepaid accounts, of recording operations carried out on the virtual prepaid accounts.

Advantageously, the method also comprises steps:

of identifying, consulting and checking these virtual prepaid accounts from the customer computers, of detecting, making it possible to identify which merchant website the virtual prepaid accounts are being queried from.

PRESENTATION OF THE FIGURES

The features and advantages of the invention will become apparent thanks to the following description, which highlights the characteristics of the invention in a non-limiting example of application.

Figure 5:
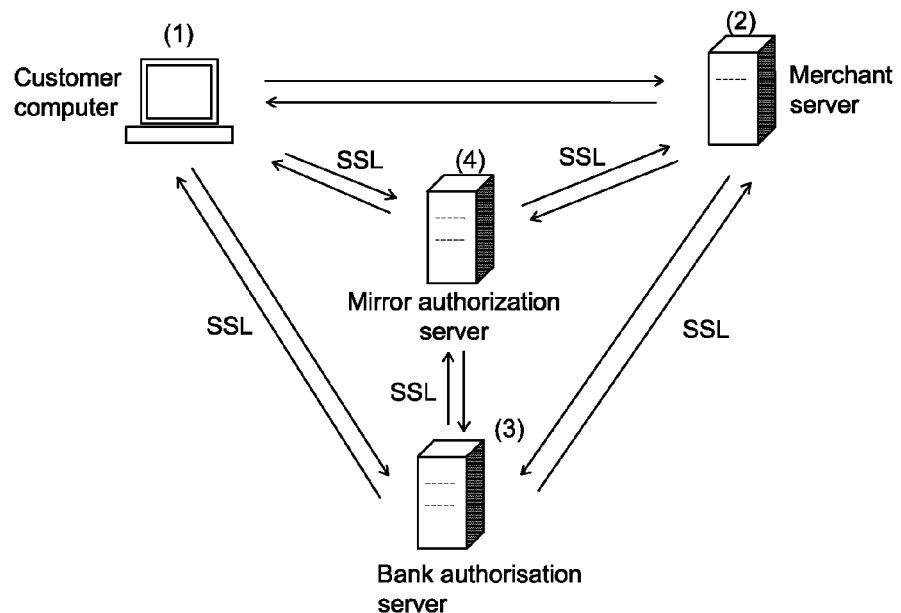
Figure 6:
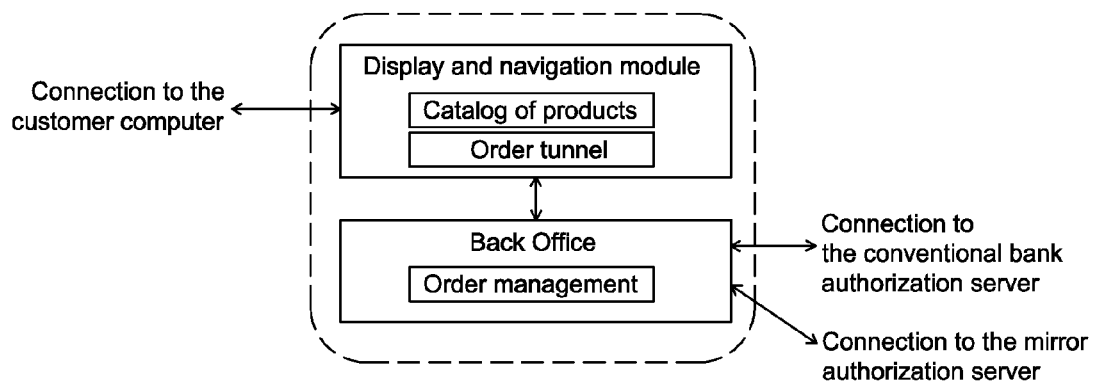
Figure 7:
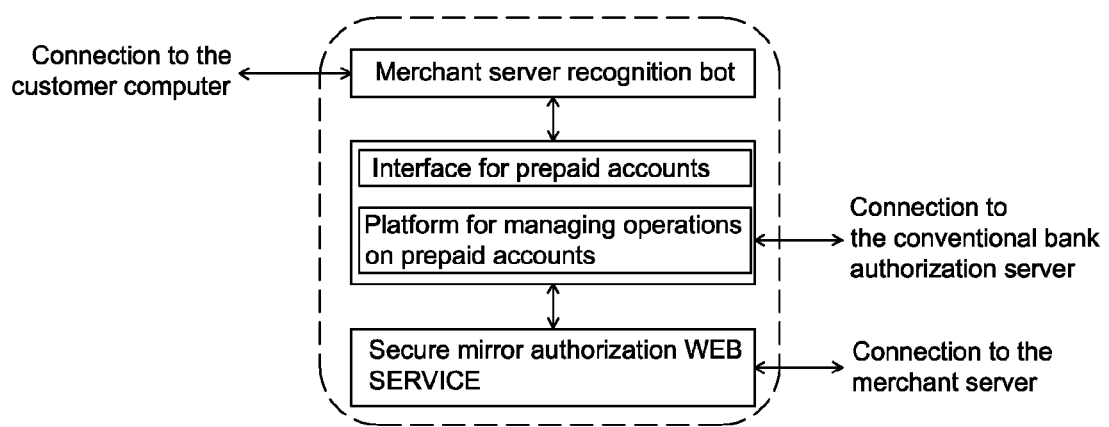

The description is based on the figures in the appendix, in which:

FIG. 1 (already mentioned) illustrates schematically the operating principle of a payment system that is the most common, and called "conventional", FIG. 2 (already mentioned) similarly illustrates a variant of the system called "conventional", FIG. 3 (already mentioned) illustrates a typical architecture of a merchant server operating in a payment system called "conventional", FIG. 4 (already mentioned) illustrates a variant of this typical architecture, FIG. 5 is a simplified schematic diagram showing the principle of this invention, FIG. 6 is a functional diagram of a typical architecture of a merchant server operating with this invention, FIG. 7 is a functional diagram of a possible architecture of a mirror authorization server operating according to the invention.

DETAILED DESCRIPTION OF AN EMBODIMENT OF THE INVENTION

The invention is a method designed to be implemented in the form of software on microcomputer (personal computer), data server or central computer ("main frame") types of computers, known per se. These computers and data servers are assumed to be interconnected by a communications network that supports an Internet type data exchange protocol.

The principle of the invention is based on the fact that a server (4), called mirror authorization server, is added and connected to a set formed by a customer computer (1), a merchant server (2) and a bank authorization server (3).

It is understood that several customer computers (10) can be connected at the same time to a single mirror authorization server (4). Similarly, several merchant servers (2) can be connected at the same time to said mirror authorization server (4).

In a first step, a customer computer (1) is connected to the merchant server (2); the latter has suitable means allowing one or more links to the server (4) to be displayed. These links include a means of detecting the merchant server (2). This means can, for example, consist of a JavaScript script installed on the merchant site and containing a unique key associated to this site. By clicking on one of these links, the calling merchant server (2) is recognized and identified by the called server (4).

The server (4), which has a suitable display means, authorizes the customer computer, in particular if it is a first connection, to create an "organizer" account, which can be accessed subsequently with an identifier and password.

At least one prepaid account, which it will subsequently be possible to credit, is associated to this customer account via a database on the server (4). Associated to each prepaid account are a unique URL access address on the server (4) and display means adjusted for the associated merchant site, i.e. to the site initially detected when the customer account was created.

From a technical point of view, the display means adjusted for each merchant site can, for example, consist of a set of HTML and CSS template files, each of these files being called by a template engine (called Template engine by people skilled in the art) depending on the merchant site detected beforehand.

In the case of a simple payment for an order placed on the merchant site the traditional triangular path, comprising a customer computer (1), the merchant server (2) and the bank authorization server (3), is followed. The merchant server (2) thus submits a transaction authorization request to the bank authorization server (3).

1/ In the case of a contribution to a payment, i.e. crediting a virtual prepaid account, the path followed, which is specific to this invention, now consists of a new triangle formed of a customer computer (1), the mirror authorization server (4) and the bank authorization server (3).

It is noted here, FIG. 5, that the server (4) is substituted for the merchant server (2) for the purpose of submitting a transaction authorization request to the bank server (3) instead and in place of the merchant server (2).

Thus, a customer computer (1) acting as "contributor" connects, via the dedicated URL for this purpose, to the prepaid account recorded on the server (4). As the prepaid account is associated to a customer computer and the latter is itself associated to a merchant server, the associated merchant site is recognized and detected.

In this way, it is proposed to the "contributor" customer computer to credit the prepaid account, via display means adjusted for the merchant site and available on the server (4). The credit request is transmitted by the server (4) to the bank authorization server (3) in the form of a conventional authorization request.

The payment means proposed to the "contributor" customer computer are the payment means accepted by the bank authorization server (3). When the authorization request is processed by the bank authorization server (3), the latter generates a payment token that is used by the server (4) to credit or not the prepaid account recorded on that server.

In this way, and following the same principle, several customer computers (1) can credit the same prepaid account on the server (4). The server (4), having suitable recording means, records each of the contributions and is able to calculate the total cumulative amount available in the prepaid account.

Subsequently, the customer computer (1) called "organizer" thus has certain credits in its prepaid account that can therefore be used for placing an order.

2/ In the case of an order using a prepaid account, the path followed, which is specific to this invention, now consists of another triangle formed by the customer computer (1) called "organizer", the merchant server (2) and the mirror authorization server (4).

It is noted here that the mirror authorization server (4) is substituted for the bank authorization server (3) for the purpose, this time, of receiving the transaction authorization request and issuing the payment token instead and in place of the bank authorization server (3).

Thus, the customer computer (1) called "organizer" must connect to the merchant server (2) associated to the prepaid account, for the purpose of placing an order on the corresponding merchant site (2).

By display means specific to the merchant server (2), a payment page on the merchant site (2) makes it possible to propose payment by means of a prepaid account. Choosing this payment mode, the customer computer (1) is now connected to its customer account on the mirror authorization server (4).

From a technical point of view, this connection means is made up of a secure SSL-type connection and authentication by identifier and password. In addition, the merchant server (2) sends an authorization request to the mirror authorization server (4) corresponding to the order amount.

Once the customer computer (1) has been authenticated on the mirror authorization server (4), suitable display means on this server (4) allow each of the prepaid accounts associated to the identified customer account to be displayed and selected.

A prepaid account is chosen from the existing accounts then simple means of comparing the total of the credits available in the prepaid account and the amount of the authorization request (normally corresponding to the order amount) allow the mirror authorization server (4) to issue a payment token that can be used by the merchant server (2) to confirm said order or to propose an additional payment if necessary, which in this case will follow the path of a contribution (path already detailed above).

From a technical point of view, the mirror authorization server (4) comprises communications means able to receive and process requests (the authorization requests) and to send back responses (the payment receipt or tokens, for example).

Said communications means are commonly called "web services" by the person in the field. The bank authorization server (3) itself comprises "web services" type communications means.

It is especially advantageous to ensure that the web service of the server (4) comprises the same functions and exactly the same sets of input and output variables (requests/responses) as those of the bank authorization server (3), hence the term "mirror authorization server" for the server (4).

The main advantage is to avoid substantial modifications to the back-office module of the merchant server (2) when this system is implemented.

In effect, the merchant server (2) is initially programmed to communicate with the bank authorization server (3) and to process the information coming from this server (3) in its order management module.

For the merchant server (2) to be able to communicate with the mirror authorization server (4) and to process the information from this server, it is only necessary, at the appropriate time, to use the URL address of the mirror authorization server (4) instead and in place of the bank authorization server (3).

By using this principle, any other modification on the merchant server (2) will be superfluous. In practice, the operation consisting of switching from one authorization server to another can be achieved simply by adding an additional payment mode, corresponding to the use of prepaid accounts, to the payment page displayed by the merchant server (2).

Thus, it is the customer computer (1) that, through its simple choice between the standard payment mode and the prepaid account payment mode, will make the authorization server URL switch between that of the authorization server (3) and that of its mirror server (4).

When a payment token is issued by the authorization server (4), recording means allow the latter to update the database containing information about prepaid accounts by subtracting from the total credits in these accounts the value of the token (i.e. the order amount).

When a prepaid account that has already been credited is not used, for a variety of reasons such as, for example, total credits too low relative to a given objective, the server (4) hosting this prepaid account can, e.g. upon request from an "organizer" customer computer (1), perform a total cancellation of all the preceding credit operations.

This cancellation consists, for the mirror server (4), of issuing a cancellation and refund request to the bank authorization server (3) for each of the credit operations recorded in the database of said server.

After having re-credited the bank accounts of the various contributors concerned, this bank server (3) will in turn issue refund notice tokens to the server (4).

The server (4) can then process these tokens and, via suitable recording means, can update the database by decreasing the prepaid account's balance by the cumulative value of the refund tokens.

Similarly, when there is an unexpended balance in a prepaid account, for a variety of reasons such as, for example, total credits too great relative to the final payment made, the server (4) hosting this prepaid account can, e.g. upon request from an "organizer" customer computer (1), perform a refund of the balance.

This cancellation consists, for the server (4), of issuing a partial refund request to the bank authorization server (3) for each of the credit operations recorded in the database of said server.

After having partially re-credited the bank accounts of the various contributors concerned in proportion to their initial contributions, this bank server (3) will in turn issue refund notice tokens to the server (4).

The server (4) can then process these tokens and, via suitable recording means, can update the database by decreasing the prepaid account's balance by the cumulative value of the refund tokens, which has the effect of reducing the prepaid account's balance to zero.

Advantages of the Method

This invention can be used in particular for implementing an online system collecting donations for marriage gift lists or baby gift lists hosted by merchant sites. Similarly, this invention allows central accounts to be created and credited online for group purchases or joint presents.

In addition, this invention can, for example, be used with the PayPal (registered trademark) bank server, which in itself proposes a large choice of electronic payment modes including bank cards and credit card payments. In this case, the mirror authorization server (4) according to the invention will have a "web service" communications means containing the same functions, input and output variables as those of the PayPal (registered trademark) web service.

The system thus designed and based on this invention may consequently be used generically on numerous merchant sites already proposing PayPal (registered trademark) payment modes, without substantial modifications to these merchant sites.

The system according to the invention does not require the use of an intermediate bank account and is adjusted for the existing architecture of a typical merchant server (2) while avoiding substantial modifications to it. Similarly, this system and method can be used generically by numerous merchant servers (2) at the same time. The common applications of such a payment system are online systems collecting donations for, e.g., marriage gift lists, baby gift lists or online joint presents.

Embodiment Variants

It is understood that, although this invention has been described with reference to a particular embodiment of it, all modifications can be made to it by the person in the field without departing from the scope of this invention as defined by the appended claims.

In an embodiment variant relating to a multi-card payment system, the customer path on the merchant site is as described below.

After adding their product to the shopping basket, the Internet user continues the normal order process. At the end of the process the Internet user arrives at the payment mode selection page. There they select a function called "multi-card payment". They are redirected to a page allowing them to enter the details of several cards that belong to them, one after the other. In the same way, several people present around the same screen can also enter their card details to share a payment (plane tickets, etc.). Once the required amount has been reached, the Internet user is redirected to the merchant site, which records the order.

The payment process is as follows:

1. When the Internet user chooses "multi-card payment", a central account is automatically created in the background, associated to the Internet user's customer number.

2. The page to which the Internet user is redirected to enter the details for multiple cards is in fact the page for crediting the central account (hosted by us on the mirror authorization server).

3. Each time card details are entered, they go through an authorization process, which allows the funds to be blocked for a predefined period of time on the bank account linked to the card. The funds are therefore not debited at this step. The central account's balance is increased, even though the funds debit order has not been given.

4. When the central account's balance has reached the amount required for the order, our server sends an authorization to the merchant site, which allows it to record the order.

5. When the merchant confirms the order through their back-office, the central account is actually debited and a transaction to debit the central account is generated.

6. Once the central account has been debited, in batch processing our system applies the debit order on the cards used to load the central account (step 3).

7. If the order is canceled after being confirmed, a transaction to re-credit the central account is generated and the system will automatically re-credit the bank cards used to load the central account.

It should be noted that if the order is not actually confirmed by the merchant, the funds are unblocked after the predefined period of time and the cards are never debited.

Parallels and differences with the method described initially.

The multi-card payment method displays the same tangible elements as the initial method (a merchant site, one or more customer computers, a conventional bank server, a mirror authorization server, a prepaid account, a payment receipt token), with the following important distinctions:

A single customer computer is associated to several possible bank cards.

Here the "prepaid account" is "pre-authorized" in the sense that the order to debit the cards has not yet been given when the order is recorded by the merchant.

There is an additional step giving the order to debit the cards (step 6) whereas, in the original process for the central account, the order to debit the card is performed at the same time as the central account's balance is increased.

The "payment reception token" provided by the mirror authorization server and allowing the merchant to record the order should rather be called "authorization token" since, when it is issued, the order to debit the cards has not yet been sent.

The invention claimed is:

1. A system for transferring data as online payments, comprising:

two or more customer computers connected to a communications network that supports an Internet-type data exchange protocol;

a merchant server connected to said network, said merchant server hosting at least one set of data formatted as pages to be transferred over the network and displayed on the customer computers, said data defining a merchant site with at least one product or service proposed for sale, the product or the service being the object of a transaction;

a bank authorization server connected to said network; and a mirror authorization server connected to said network, said mirror authorization server being distinct from the bank authorization server, said mirror authorization server comprising a CPU and data storage having program code stored thereon which causes the mirror authorization server to create and initialize, responsive to a request received from a first of said two or more customer computers, a virtual data file in a database hosted on said mirror authorization server, the virtual data file serving as a virtual prepaid account for a customer operating the first of said two or more customer computers, the virtual prepaid account being associated to at least one unique identification data item and being distinct from accounts recorded at the bank authorization server, wherein the mirror authorization server is further configured to, via said program code record a credit in the database, responsive to a request from a second of the at least two customer computers, to add value to the virtual prepaid account, after issuing an authorization request to the bank authorization server and receiving a response that indicates a payment from the bank authorization server to the mirror authorization server, wherein the mirror authorization server is further configured to, via said program code, debit the virtual prepaid account in the database after receiving a transaction authorization request from the merchant server and issuing a payment to the merchant server for carrying out the transaction, wherein the merchant server accepts payment from any of the mirror authorization server and the bank authorization server, and wherein the mirror authorization server is yet further configured to, via said program code, responsive to a cancellation request received from the first of the two or more customer computers, issue a cancellation and refund request to the bank authorization server for each credit recorded in the database associated with the virtual prepaid account.

2. The transfer system according to claim 1, wherein the mirror authorization server is further configured to, via said program code, accept requests to access information concerning the virtual prepaid account from the two or more customer computers, said access being controlled by the mirror authorization server based on the identifier associated with the virtual prepaid account.

3. The transfer system according to claim 1,
wherein a plurality of merchant servers are connected to the network, and
wherein the mirror authorization server is further configured to, via said program code, detect one merchant server of the plurality of merchant servers that is associated with the virtual prepaid account.

4. The transfer system according to claim 3, further comprising:
means of detecting the plurality of merchant servers consulted by the customer computers; and
display means adjusted for the plurality of merchant servers detected.

5. The transfer system according to claim 1, wherein the mirror authorization server is further configured to, via said program code, record operations carried out on the virtual prepaid account in an operations database.

6. The transfer system according to claim 1, wherein the mirror authorization server is further configured to, via said program code, carry out communications that utilize inputs and outputs having identical formats to communications of the bank authorization server.

7. The transfer system according to claim 4, wherein the mirror authorization server generates and transmits, via the network, a payment receipt token, said token comprising an item of information, obtained after digitally comparing a balance of the virtual prepaid account and an amount associated with an order placed at the merchant server, that indicates whether or not the prepaid account has a balance greater than or equal to a value of said order required to confirm the order.

8. The transfer system according to claim 1, further comprising:
means of identifying any of the customer computers that have virtual prepaid accounts by way of an identifier and password.

9. The transfer system according to claim 1, wherein the mirror authorization server uses same functions and same sets of input and output variables for requests and responses as those of the bank authorization server.

10. The transfer system according to claim 1, wherein the mirror authorization server transmits a payment to the merchant server in a form compatible with that of the bank authorization server such that the merchant server accepts the payment from the mirror authorization server.

11. An online payment method carried out on i) two or more customer computers connected to a communications network that supports an Internet-type data exchange protocol, ii) a merchant server connected to said network, said merchant server hosting at least one set of data stored on a data storage device and formatted as pages for transfer over the network and display on the customer computers, said data defining a merchant site with at least one product or service proposed for sale, and iii) a bank authorization server connected to said network, the method comprising:
providing a mirror authorization server in connection with said network and distinct from the bank authorization server;
at the mirror authorization server, and upon receipt of a request received at the mirror authorization server from a first of said two or more customer computers, creating and initializing a virtual prepaid account in a database hosted on said mirror authorization server, said prepaid account being distinctive from the account information stored at said bank authorization server;
at the mirror authorization server, and upon receipt of a request received at the mirror authorization server via from a second of the two or more customer computers, crediting said virtual prepaid account by one or more additions, any of the two or more customer computers being capable of contributing to the virtual prepaid account, after issuing an authorization request to the bank authorization server and receiving a response from the bank authorization server that indicates a payment from the bank authorization server to the mirror authorization server;
debiting said virtual prepaid accounts on the mirror authorization server, said debiting taking place by, from an action initiated by a transaction generated by one of the two or more customer computers, receiving a transaction authorization request from the merchant server and issuing a payment to the merchant server for carrying out a transaction; and
recording, at the mirror authorization server, any operations carried out on the virtual prepaid account,
wherein the mirror authorization server, responsive to a cancellation request received from the first of the two or more customer computers, issues a cancellation and refund request to the bank authorization server for each credit recorded in the database associated with the virtual prepaid account, and
wherein the merchant server accepts payment from any of the mirror authorization server and the bank authorization server.

12. The online payment method as recited in claim 11, wherein a web service of the mirror authorization server uses same functions and same sets of input and output variables for requests and responses as those of the bank authorization server.

* * * * *